Figure 3:
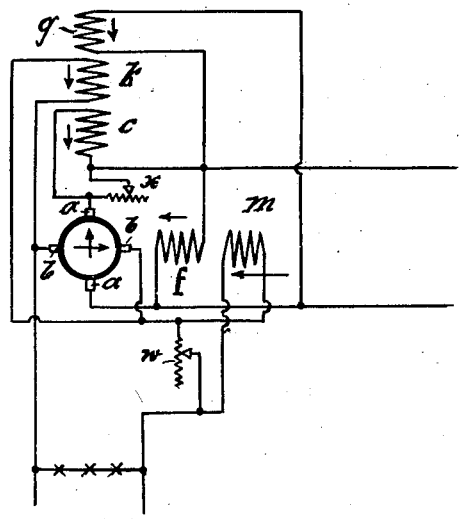

M. M. OSNOS.
SYSTEM FOR CONTROLLING THE STRENGTH OF DIRECT CURRENTS IN ELECTRICAL CIRCUITS.
APPLICATION FILED OCT. 29, 1907.
914,177.
Patented Mar. 2, 1909.
3 SHEETS—SHEET 1.
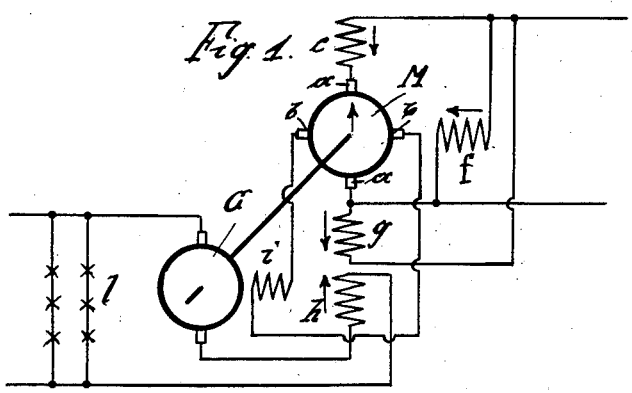
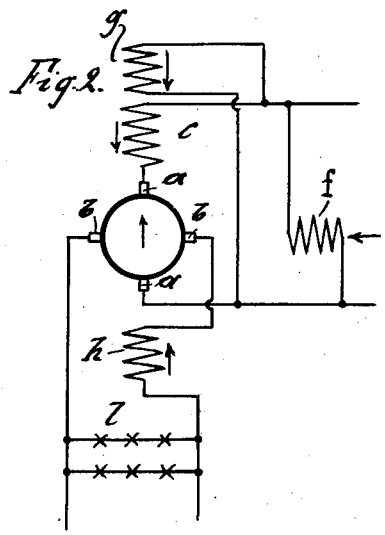
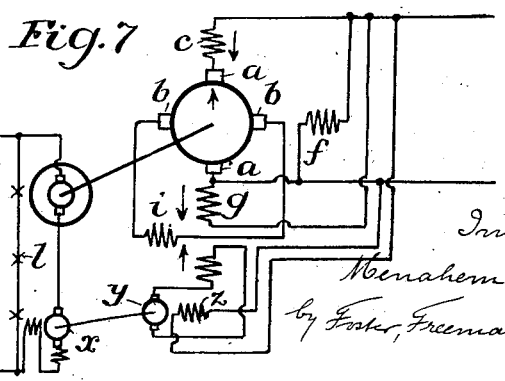

M. M. OSNOS.
SYSTEM FOR CONTROLLING THE STRENGTH OF DIRECT CURRENTS IN ELECTRICAL CIRCUITS.
APPLICATION FILED OCT. 29, 1907.

914,177.

Patented Mar. 2, 1909.
3 SHEETS—SHEET 2.

Witnesses:
J. J. McCarthy
J. G. Hinkel

Inventor.
Menahem M. Osnos,
by Foster, Freeman, Watson & Coit,
attorneys.

UNITED STATES PATENT OFFICE.

MENAHEM MENDEL OSNOS, OF FRANKFORT-ON-THE-MAIN, GERMANY, ASSIGNOR TO THE FIRM OF FELTEN & GUILLEAUME-LAHMEYERWERKE ACTIEN GESELLSCHAFT, OF FRANKFORT-ON-THE-MAIN, GERMANY.

SYSTEM FOR CONTROLLING THE STRENGTH OF DIRECT CURRENTS IN ELECTRICAL CIRCUITS.

No. 914,177.  Specification of Letters Patent.  Patented March 2, 1909.

Application filed October 29, 1907. Serial No. 399,685.

*To all whom it may concern:*

Be it known that I, MENAHEM MENDEL OSNOS, a subject of the Czar of All Russias, and a resident of Frankfort-on-the-Main, Germany, have invented certain new and useful Improvements in Systems for Controlling the Strength of Direct Currents in Electrical Circuits, of which the following is a specification.

My invention relates to improvements in a system for controlling the strength of direct currents in electrical circuits.

The invention is particularly designed for use in circuits in which the number of the translating devices, the resistance of the circuit, or the counter-electromotive forces of apparatus connected within the circuit may vary within large limits, or which may be intentionally or accidentally short-circuited.

The object of the improvements is to provide a system, whereby the strength of the current is maintained within normal limits. For this purpose, there is included, between the source of current supply and the working circuit a machine, or a group of machines, comprising a motor portion and a generator portion. In said intermediate machine, or group of machines, the current-producing or generator portion is energized by a voltage taken from the current-consuming or motor portion. The said voltage is produced by an additional magnetic field traversing the armature of the motor portion, which field is so affected by the current taken from the generator portion that it decreases upon an increase of the latter. Therefore, the voltage at the poles of the generator portion is decreased, so that its current is maintained within normal limits.

For the purpose of explaining the invention, I have shown several examples embodying the same in the accompanying drawings, in which the same reference characters have been used in all the views to indicate corresponding parts.

Figure 4:
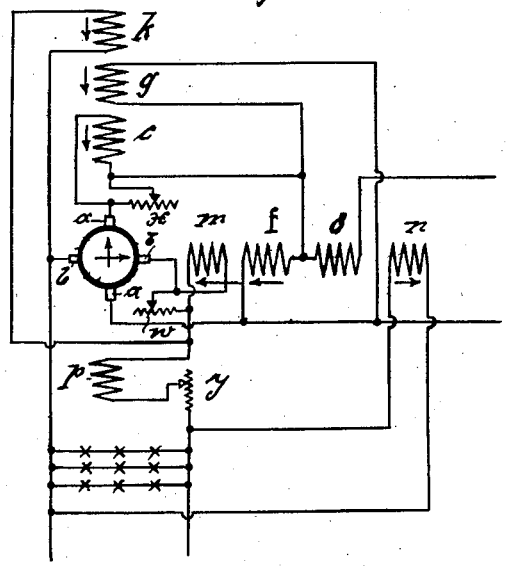
Figure 5:
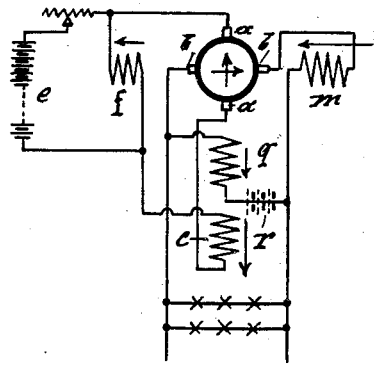
Figure 6:
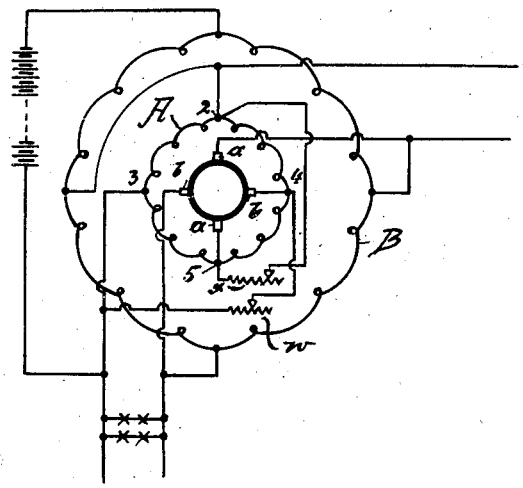

In said drawings: Figure 1, is a diagrammatic view of a system embodying the invention, the motor and generator portions being shown as separate machines; Fig. 2, is a similar view, showing a modification of Fig. 1, wherein the motor and generator portions of the system are combined into a single machine; Fig. 3, is a similar view of a modification of Fig. 2, in which means are provided to vary the voltage taken from the generator side of the machine; Fig. 4, is a similar view of a modification of Figs. 2 and 3, in which means are provided to cause the field of the motor portion of the machine to be influenced by the voltage of the generator portion; Fig. 5 shows a modification in which the current supplied to the motor is taken from a battery, the field magnet of said motor being connected in shunt to said battery; Fig. 6, is a view of a further modification showing a method of combining several of the field coils of the examples shown in Figs. 1–5 into a single coil; and Fig. 7, is a diagrammatic view of an alternating direct current transformer system embodying the invention.

Referring particularly to the example illustrated in Fig. 1, the system comprises an intermediate group of machines which consists of a shunt-wound direct-current motor M, and a direct-current generator G operated by said motor and which may be connected thereto by means of a clutch mechanism. The said generator is used to supply current to arc lamps $l$ which, for instance may be adapted to be extinguished by bringing their electrodes into contact with each other. The motor M is provided with a field winding $f$ energized by the voltage of the supply circuit, and with brushes $a$ $a$ coöperating with said field winding. I provide a compensating coil $c$, arranged substantially on the axis of the brushes $a$ $a$, which lead the current into the motor, whereby the armature field of the motor in the direction of the line connecting the brushes is compensated. A magnetizing coil $g$ is arranged to operate in the same direction, while a coil $h$, traversed by the current of the generator G, or a current proportional thereto, is arranged to act in a direction opposite to the latter, so that an increase of the generator current causes a decrease of the field along the axis of the brushes $a$ $a$. Auxiliary brushes $b$ $b$, preferably located substantially on the magnetic axis of the field magnet coil $f$ of the motor, coöperate with the field on the axis of brushes $a$ $a$ and supply current to the field magnet winding $i$ of the generator G. As the brushes $b\,b$ are arranged in line with the axis of the main field $f$ of the motor M, it is evident that said field can not, by the rotation of the armature of the motor, produce an electromotive force at the brushes $b\,b$. However, by the rotation of the armature of the motor within the field produced by the coils $g$ and $h$ located on the axis of the brushes $a\,a$, an electromotive force is produced at the brushes $b\,b$, which causes an exciting current to flow through the field winding $i$ of the generator G. This electromotive force, or the exciting current produced thereby, is evidently weakened, as the current of the generator G increases, inasmuch as the field of the coil $h$, energized thereby, opposes the field of the coil $g$. Now, as the slightest increase of the strength of the current of the generator G weakens the field of the latter, the current of the generator can not increase beyond a predetermined limit, even although the external resistance of the working circuit of the generator should decrease to zero.

The motor M and the generator G of the intermediate group of machines may be combined into a single machine, in which case, however, the machines must be so arranged as not to influence each other. A suitable method consists in constructing one of the machines with the double number of poles of the other, or in displacing one of the machines relatively to the other, one half the angular distance between the poles. I have shown such a combined machine in Fig. 2, in which the generator field coil corresponding with the coil $i$ in Fig. 1 is combined with the shunt coil $g$ of the motor. The latter and the oppositely directed coil $h$, traversed by the current taken from the generator portion of the machine, produce the field coöperating with the generator or current-supplying brushes $b$, the axis of said field being substantially in line with the motor or current-receiving brushes $a$. The armature field set up in the direction of the brushes $a\,a$ is again compensated by the series coil $c$.

As will appear from the above description, the subsidiary machine prevents an increase of the current beyond a predetermined limit, for which purpose a practically constant excitation and an oppositely acting coil energized by the working current of the generator portion, of a current proportional to the latter, coöperate to produce a voltage which decreases with an increase of the generator current, and which is used to excite the generator portion of the machine. In the example illustrated in Figs. 3 to 6, the field of the generator portion is further influenced by a coil traversed by the dynamo current and acting in the direction of the current-supplying or generator brushes. By means of said coil, an electromotive force is produced at the brushes of the motor portion of the machine, which weakens the dynamo field, upon an increase of the dynamo current, the axis of said field being substantially in line with the motor brushes.

Referring to the example shown in Fig. 3, current is supplied to the machine through the brushes $a\,a$ and a series compensating coil $c$. The current supplied to the coil $c$ can be regulated at will by means of an adjustable resistance and which may be reversed under certain circumstances. However, to prevent sparking, it is generally preferable to have the coil $c$ counteract the armature field produced in the direction of the brushes $a\,a$. The shunt magnet $g$ produces a field which is preferably in the direction of the field resulting from the coil $c$ and the armature winding along the line of the brushes $a\,a$. A coil $k$, connected to the current supplying brushes $b\,b$, operates in the same direction as the coil $g$, and coöperates therewith to produce a field which is active relatively to the brushes $b\,b$. As the coil $k$ is connected in shunt with the working circuit, an increase in the current supplied to the said circuit by the generator portion of the system, causes a decrease of the current exciting the coil $k$, and, thereby, a decrease of the voltage at the generator brushes $b\,b$. The coils $g$ and $k$ have therefore the same function as the coils $g$ and $h$ of the examples described with reference to Figs. 1 and 2. If desired, the coils $g$ or $k$ may simultaneously be used to increase or decrease the compensation of the armature field, or to overcompensate the same. A shunt coil $f$ is provided, which generates the active motor field in line with the brushes $b\,b$. Furthermore, in series with the brushes $b\,b$ a coil $m$ is provided which can be regulated by means of a resistance $w$, and, if desired, may be arranged to be reversed. If the external resistance of the dynamo circuit, and thereby the voltage of the same, is decreased, while simultaneously the dynamo current is increased, the current supplied to the motor portion must decrease to avoid an excessive speed of the latter. To effect this regulation, the motor field is strengthened by passing the generator current through the coil $m$. In this case the field set up by the coil $m$ and that due to the armature current acting in the direction of the brushes $b\,b$, assist each other. Thereby the counter-electromotive force of the motor is increased when the current of the generator is increased, that is, when the external resistance of the generator circuit is decreased, while the current supplied to the motor is decreased. Simultaneously, in the case of overcompensation in the direction of the brushes $a\,a$, the generator field set up in the direction of the brushes $a\,a$ and thereby the voltage of the generator, is decreased by the counter-electromotive force, when the generator current is increased, because the current passing through the coil $c$ and therefore the generator field produced by the latter, are decreased. It is evident, therefore, that the coil $m$ has the double effect of assisting the coil $k$ in regulating the generator current, and of controlling the speed of the motor. In a similar way, the motor field can be influenced by the voltage of the generator, so that by a decrease of the voltage of the generator circuit the field of the motor is weakened in a less degree. For this purpose, a coil $n$ may be provided, as shown in Fig. 4, which coil is connected to receive the voltage of the generator, that is in shunt to the working current, and, preferably is so arranged as to counteract the active field of the motor. As in the example shown in Fig. 3, the regulation of the armature fields on the two axes is effected independently of each other by influencing the series compensating coil $c$, or the coil $m$ on the respective axes. It may be preferable under certain circumstances, for instance, if it is desired to have the speed of the system dependent of the load of the motor, to influence the action of the said coil $m$ in one or the other direction by a series coil $c$ energized by the current of the supply circuit. It is not necessary to connect the coil $k$ directly to the current-supplying or generator brushes $b$ $b$, as shown in Fig. 3, but it may be connected to receive a voltage proportional to the voltage of said brushes. In Fig. 4 a further coil $p$ is shown which acts in the direction of the brushes $a$, $a$, and is traversed by the generator current. It can be regulated by means of a resistance $y$, whereby the generator may be compounded, or counter-compounded, as desired.

A further example of the invention is shown in Fig. 5 in which the motor circuit is supplied with current from a battery $e$ by means of the brushes $a$, $a$. The main field electro magnet $f$ is connected in shunt with the said battery, and its effect in the direction of the brushes $b$, $b$, may be increased or decreased by the coil $m$, arranged on the axis thereof, and traversed by the generator current, and which may be provided with regulating means. The coil $m$ may be so arranged as to weaken the active field in the direction of the brushes $b$, $b$, if it is desired to have the short-circuit current stronger than the normal current. In this case, the machine runs at a higher speed in the case of a short-circuit, than under normal conditions. The coil $q$ acting in the direction of the brushes $a$, $a$, may be energized, for example, by a battery $r$ and also by the voltage of the generator, to produce the main field of the generator, combining in the same manner as the coils $q$ and $k$ in Fig. 3. In this case also the field is, preferably, regulated by the coil $c$, which is connected in series with the brushes $a$, $a$, which may in part or entirely counterbalance the motor-field in the direction of the said brushes. Preferably, the coil $c$ acts, in combination, with the armature field in the direction of the brushes $a$, $a$, in such a way, that a decrease of the motor current causes a decrease of the voltage of the generator. This is the case, if the arithmetical sum of the armature field in the direction of the brushes $a$, $a$, and the compensating field of the coil $c$ acts in the same direction as the generator field produced by the coil $q$.

In many cases, it will be advisable to combine some of the coils described with the arrangements shown in Figs. 3 to 5. This may be advisable, for instance, where it is desired to locate the compensating coils as near to the armature as possible. An example of such a combination of various coils is shown in Fig. 6, in which coils A and B are arranged on the core of the field magnet. The motor current passing over the brushes $a$, $a$, at the pole (5) enters the ring winding A and leaves the latter at the pole 2, (the winding between the poles 5 and 2 in Fig. 6 corresponding to the winding $c$ in Fig. 3). The regulation may be effected by means of a resistance $x$ included between the poles 5 and 2. The generator current flows from the brushes $b$, $b$ through the winding A between the poles 4 and 3, to the working circuit, the winding between the poles 3 and 4 corresponding to the coil $m$ in Fig. 3. In the same manner the ring winding B corresponds to the combined coils $f$, and $c$, (Fig. 5) or to the combined windings $f$, $g$ and $k$, Fig. 3.

As the brushes of the machine are each in the axis of a field, it is preferable to use commutating poles in machines of the character described, or notches in the body of the field magnet located in the commutating zone, in order to prevent or decrease sparking of the brushes.

The effect of the working currents of the motor and generator parts of the armature coils can be regulated at will and independently of each other in all the cases, and for this purpose, regulating means are provided in connection with the coils located on the field core, and preferably substantially in the axes of the corresponding armature fields. Thus, the effect, of the coil $c$ connected in series with the current receiving brushes $a$, $a$, may be arranged to be regulated at will.

If it is desired temporarily to take a smaller voltage from the generator part of the system, I prefer to make the last named coil reversible. For example if it is connected to the system in such a way as to strengthen the armature field produced in the direction of the current receiving brushes, the active generator field existing in the axes of the said brushes is, for the same number of revolutions, weakened, as compared with the arrangement in which the coil is connected to the system in the opposite sense.

The system described may also be used, where direct current is transformed into alternating current, or vice versa. In this case, wherever a direct current field is to be influenced by an alternating current, a motor-generator must be provided. An example of an alternating-direct current transformer, or motor-generator embodying the invention is shown in Fig. 7, the system shown corresponding to that of Fig. 1. The alternating current taken from the alternating current generator G, does not directly traverse the coil H, but serves to actuate the motor portion of an alternating-direct current motor-generator constructed as an alternating current series motor, the direct current generator portion thereof having the field coil $z$, excited from the direct current circuit of the motor M. This direct current generator $y$ in turn supplies the exciting current for the field $h$ of the motor M. As the current taken from the alternating current generator G increases the speed of the alternating current series motor $x$ is increased thus increasing the current in the coil $h$ which is energized by the exciting machine $y$ and thereby weakening the subsidiary field of the motor M in the line connecting the brushes $a, a$.

Having thus described the invention, what is claimed is:

1. In a system for controlling the strength of current supplied to translating devices, a supply circuit, a working circuit, and a regulator having a motor portion provided with a field magnet and an armature connected to the supply circuit, a generator portion connected with the working circuit, additional field windings on the motor portion angularly displaced with relation to the axis of said field magnet, one of said windings being energized by a practically constant current, and another of said windings being energized by a current from the generator portion, and brushes on the motor portion for operating with the field due to said additional windings and connected with the fields of the generator portion.

2. In a system for controlling the strength of current supplied to translating devices, a supply circuit, a working circuit, and a regulator having a motor portion provided with a field magnet and an armature having current receiving brushes connected to the supply circuit, a generator portion connected with the working circuit, additional field windings on the motor portion arranged substantially on the axis of said brushes of the motor portion, one of said windings being energized by a practically constant current, and another of said windings being energized by a current from the generator portion, and brushes on the motor portions coöperating with the field due to said additional windings and connected with the field of the generator portion.

3. In a system for controlling the strength of current supplied to translating devices, a supply circuit, a working circuit, and controlling apparatus comprising a motor portion and a generator portion connected respectively to said supply and working circuits, said motor portion having a main field winding and a plurality of auxiliary field windings angularly displaced from said main winding, one of said auxiliary windings being excited by a practically constant current and another of said windings being energized by current varying in proportion to the variations in the current of the generator portion, and current supplying brushes on the motor portions coöperating with the field of said auxiliary windings to furnish current for the excitation of the generator portion.

In testimony whereof I have signed my name to this specification in the presence of two subscribing witnesses.

MENAHEM MENDEL OSNOS

Witnesses:
JEAN GRUND,
ERWIN DEPPELI